United States Patent
Mahajan et al.

(10) Patent No.: US 7,779,094 B2
(45) Date of Patent: Aug. 17, 2010

(54) EVENT PROBLEM REPORT BUNDLES IN XML FORMAT

(75) Inventors: Pallavi Mahajan, Ghaziabad (IN); Dogu Narin, Sunnyvale, CA (US); M. Richard Salaiz, Oakland, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 246 days.

(21) Appl. No.: 11/842,239

(22) Filed: Aug. 21, 2007

(65) Prior Publication Data

US 2009/0052329 A1   Feb. 26, 2009

(51) Int. Cl.
*G06F 15/16* (2006.01)
(52) U.S. Cl. .......................... 709/221; 709/224; 714/39
(58) Field of Classification Search ................ 709/221, 709/223, 224; 714/39
See application file for complete search history.

(56) References Cited

U.S. PATENT DOCUMENTS

2002/0143908 A1* 10/2002 Taggart et al. .............. 709/223
2004/0078695 A1* 4/2004 Bowers et al. ................ 714/39

FOREIGN PATENT DOCUMENTS

WO    WO 98/24222        6/1998
WO    WO 00/72183 A2    11/2000

* cited by examiner

*Primary Examiner*—David Lazaro
(74) *Attorney, Agent, or Firm*—Harrity & Harrity, LLP

(57) ABSTRACT

A network device may include logic configured to detect that an event has occurred in the network device, determine an XML document structure based on the detected event, and generate an XML document with the determined structure including information relating to the detected event.

10 Claims, 8 Drawing Sheets

EVENT PROBLEM REPORT BUNDLES IN XML FORMAT

BACKGROUND INFORMATION

Event detection and management systems typically store conditions, that when satisfied, generate error messages within a device. The error message, such as alert indicating a possible error, may be sent as a message to a remote location. In most cases, the error messages sent by existing systems do not provide adequate information or procedures relating to how to fix errors within the device. In other cases, error messages provide large amounts of data and information that may not be understood by network operators receiving the message.

SUMMARY

According to one aspect, a network device is provided. The network device may comprise logic configured to detect that an event has occurred in the network device, determine an XML document structure based on the detected event, and generate an XML document with the determined structure including information relating to the detected event.

According to another aspect, a method is provided. The method may comprise detecting an event within a network device, determining and forming an XML header file based on the detected event, determining and forming XML payload files based on the XML header file, wherein the XML header file and XML payload files include information relating to the detected event, and bundling and transmitting the XML header file and the XML payload files to a second network device.

According to another aspect, a network device may comprise logic configured to receive an XML document including an XML header file and XML payload files, filter tagged fields within the XML header file and the XML payload files for identified tagged fields, wherein the tagged fields within the XML header file and the XML payload files relate to an event that occurred in a second network device, and analyze information in the identified tagged fields.

According to another aspect, a method is provided. The method may comprise receiving an XML structured document including an XML header file and a plurality of XML payload files, wherein the XML header file and the plurality of XML payload files include tagged fields of information that relate to an event that occurred in a remote network device, examining the tagged fields of information in the XML header file to identify tagged fields of information in the XML payload files, filtering the XML payload files for the identified tagged fields of information, and analyzing information in the identified tagged fields of information.

DETAILED DESCRIPTION OF PREFERRED EMBODIMENTS

The following detailed description refers to the accompanying drawings. The same reference numbers in different drawings may identify the same or similar elements. In addition, while some of the following description is provided mainly in the context of routers or other network elements at layer 2 and/or layer 3 of the Open Systems Interconnection (OSI) Model, the principles and teachings may be applied to different types of network devices at different layers of communication (e.g., a Multi-protocol label switching (MPLS) routers, a Synchronous Optical Network (SONET) add-drop multiplexers, a Gigabit Passive Optical network (GPONs) switches, a Synchronous Digital Hierarchy (SDH) network elements, etc.).

Figure 1:
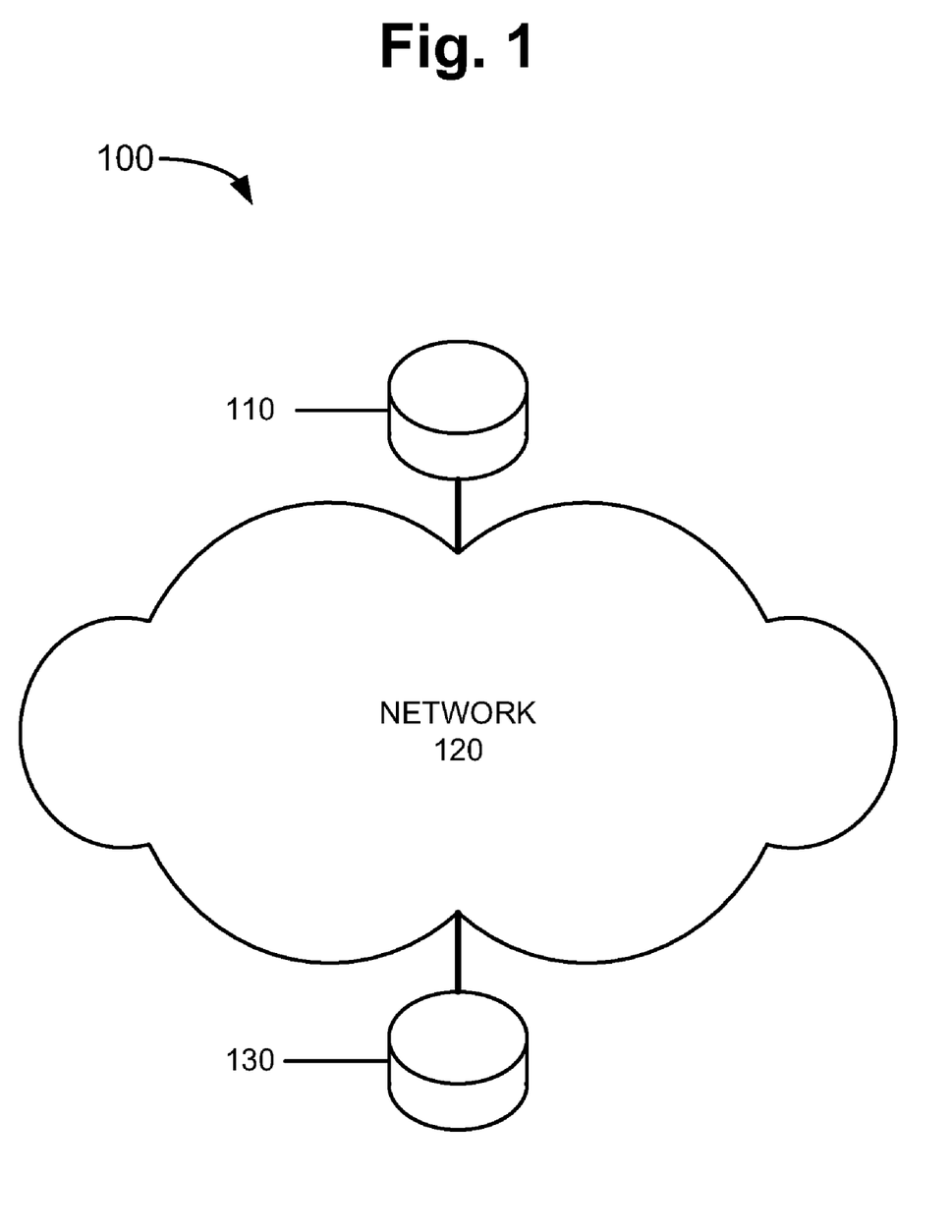
FIG. 1 shows a network in which concepts described herein may be implemented.

FIG. 1 shows an exemplary network in which concepts described herein may be implemented. As shown, network 100 may include network element 110, network 120 and network device 130. In practice, network 100 may include additional elements than those illustrated in FIG. 1. Network element 110 may include devices for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network device 130 may include a server, a computer or another network element. Network element 110 may communicate with other network elements (not shown) and may communicate with network device 130 through wired or wireless communication links via network 120.

Figure 2:
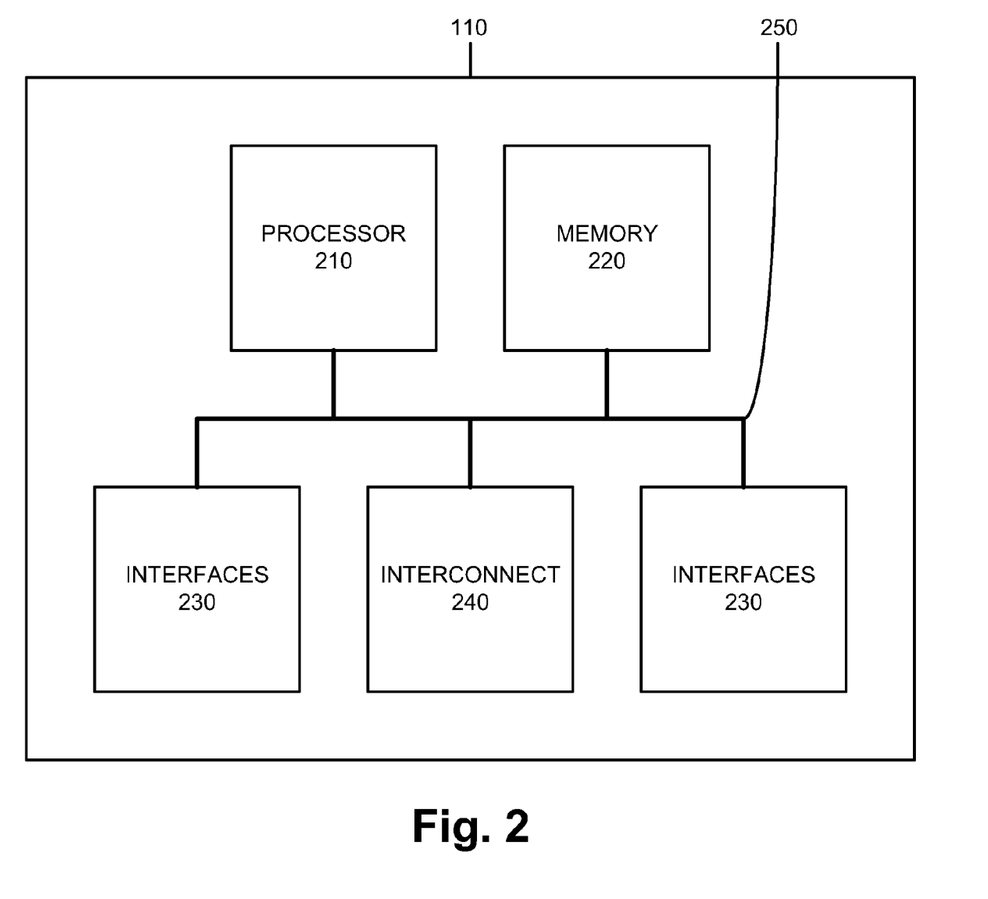
FIG. 2 is a block diagram of an exemplary device of FIG. 1.

FIG. 2 shows an exemplary block diagram of network element 110. As shown, network element 110 may include a processor 210, memory 220, interfaces 230, an interconnect 240, and a bus 250. In other implementations, network element 110 may include fewer, additional, or different components than those illustrated in FIG. 2.

Processor 210 may include one or more processors, microprocessors, application specific integrated circuits (ASICs), field programming gate arrays (FPGAs), and/or processing logic optimized for networking and communications. Memory 220 may include static memory, such as read only memory (ROM), dynamic memory, such as random access memory (RAM), and/or onboard cache, for storing data and machine-readable instructions. Memory 220 may also include storage devices, such as a floppy disk, a CD ROM, a CD read/write (R/W) disc, and/or flash memory, as well as other types of storage devices. Interfaces 230 may include devices for receiving incoming data stream from networks and for transmitting data to networks (e.g., Ethernet card, optical carrier (OC) interfaces, asynchronous transfer mode (ATM) interfaces, etc.). Interconnect 240 may include one or more switches or switch fabrics for directing incoming network traffic from one or more of interfaces 230 to others of interfaces 230. Bus 250 may include a path that permits communication among processor 210, memory 220, interfaces 230, and/or interconnects 240.

Depending on implementation, the components that are shown in FIG. 2 may provide fewer or additional functionalities. For example, if network element 110 performs an Internet Protocol (IP) packet routing function as part of a MPLS router, processor 210 may perform tasks associated with obtaining routing information from other routers in a MPLS network. In such cases, conveying network traffic from one interface to another may involve label based routing, rather than IP address based routing.

Figure 3:
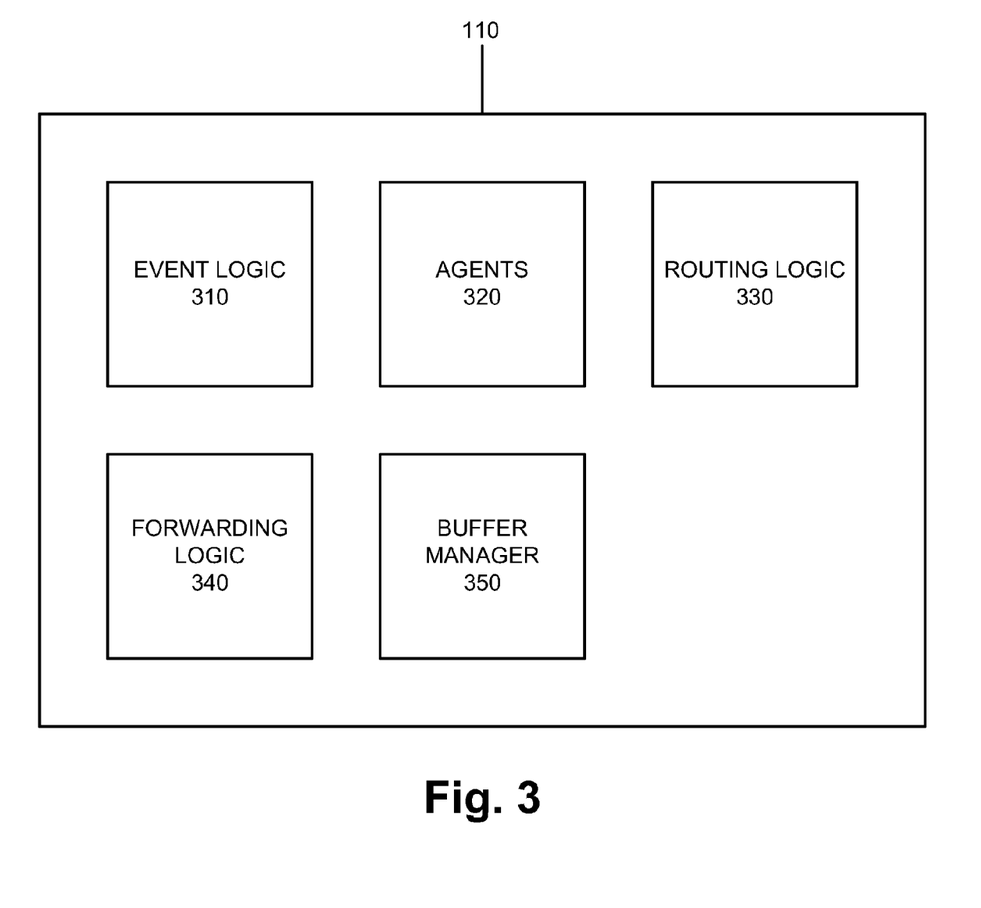
FIG. 3 is a functional block diagram of the device of FIG. 1.

FIG. 3 is a functional block diagram of a network element 110 that includes a router. As shown, network element 110 may include event logic 310, agents 320, routing logic 330, forwarding logic 340, and buffer manager 350. In different implementations, network element 110 may include fewer, additional, or different components than those illustrated in FIG. 3. For example, network element 110 may or may not provide certain network management functions, and in such instances, network element 110 may not include certain agents 320.

Event logic 310 may include hardware and/or software for performing various event driven functions for management and operation of network element 110 and may create and transmit an XML problem report bundle, based on a detected event, to other network elements. For example, event logic 310 may provide embedded reactive and proactive scripts used to collect and analyze data to monitor performance within network element 110. Event logic 310 may further provide correlation of events and time periods, and in response to the analysis of correlated events/time periods, make decisions to reconfigure operations of network element 110. Event logic 310 may also provide a user interface via which a network administrator or a user can interact with network element 110 and receive XML problem report bundles that may include data relating to errors and/or corrective actions taken within network element 110. A functional block diagram of the components of event logic 310 is shown in FIG. 4.

Agents 320 may include hardware and/or software for monitoring and/or controlling components on behalf of event logic 310. The monitored components may include a physical device (e.g., a plug-in card, a multiplexer, a switch, etc.) or a logical device, such as a virtual connection or a logical interface. In monitoring the components, agent 320 may detect a fault or a recovery of an interface, an interconnect, or any other component of network element 110 and may report the fault or the recovery to the event logic 310. For example, agents 320 may detect a failure of one of interfaces 230 and may send associated alarms or error messages to event logic 310. In another example, agents 320 may receive commands from a remote device and may make appropriate configuration changes to interfaces 230. In some implementations, agents 320 may be attached or connected to other subcomponents of network element 110.

Routing logic 330 may include hardware and/or software for communicating with other routers to gather and store routing information in a routing information base (RIB). Forwarding logic 340 may include hardware and/or software for directing a packet to a proper output port on one of interfaces 230 based on routing information in the RIB. Buffer manager 350 may provide a buffer for queuing incoming packets. If packets arrive simultaneously, one or more of the packets may be stored in the buffer until higher priority packets are processed and/or transmitted.

Figure 4:
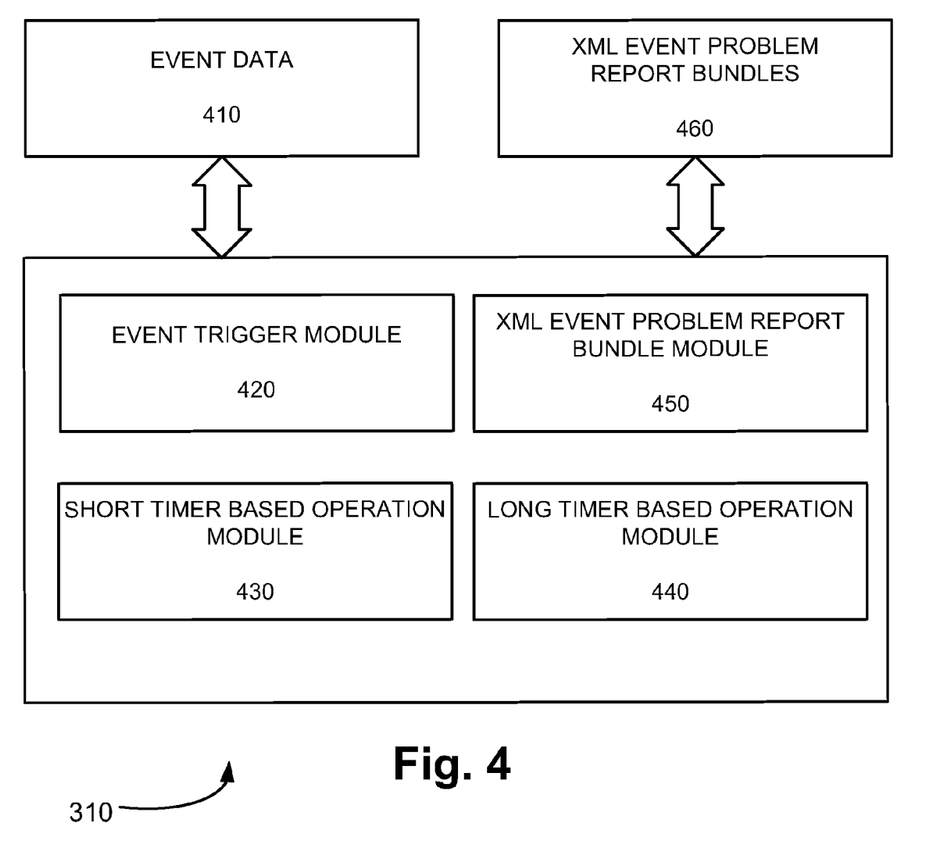
FIG. 4 is a functional block diagram of event logic of FIG. 3.

FIG. 4 shows an exemplary functional block diagram of event logic 310. As shown, event logic 310 may include an event trigger module 420, a short timer based operation module 430, a long timer based operation module 440 and an XML event problem report bundle module 450. Event logic 310 may transmit and receive event data 410 and XML event problem report bundles 460. In different implementations, event logic 310 may include fewer, additional, or different components than those illustrated in FIG. 4.

Event data 410 may include information related to events and/or the status of hardware and software contained within network element 110. For example, the components shown in FIG. 2 such as processor 210, memory 220, interfaces 230 and interconnect 240 may provide signals and information identifying certain events. For example, processor 210 may provide event data 410 including information relating to the status of internal registers becoming overloaded or unused. Similarly, the functional components shown in FIG. 3 may also provide event data 410 that may include information related to status and events. For example, routing logic 330 may provide event data 410 that may include information indicating a processing failure regarding routing information base (RIB). In other examples, event data 410 may include information related to events and/or the status of hardware and/or software contained in another network element connected to network 120.

Event trigger module 420 may include hardware and/or software that may receive a signal from XML problem report bundle module 450 and invoke a script. For example, a process may be contained within a script that may identify a hardware or software problem, collect data relating to the identified problem, perform an analysis of the collected data, perform a corrective action based on the analysis and send the collected data to XML event problem report bundle module 450. The analysis performed by an invoked script within event trigger module 420 may include any appropriate analysis algorithm, such as, for example, a decision tree or an artificial intelligence database. The specific type of analysis performed by each script may be determined by the specific event/policy that invoked the script. For example, if event data 410 contains information that some component of network element 110 is using 90% of processor resources, a script contained in event trigger module 420 may be invoked by XML problem report bundle module 450 to collect data and may determine what component is using the resources, what the nature of the problem is and/or what if any corrective actions may be taken. Event trigger module 420 may also invoke additional scripts based on the collected and analyzed data. For example, if a component is positively identified as using 90% of the processor's resources, an additional script may be invoked to collect data from the identified component to further determine the nature of the problem. Event trigger module 420 may also create new scripts based on the analysis or results of additional scripts. For example, if a specific hardware device is identified as potentially faulty by a previous script, a new script may be created that contains new parameters to monitor regarding the identified hardware device. Scripts invoked by event trigger module 420 may be referred to as "reactive" scripts, as these scripts may be invoked to react to a received event.

Short timer based operation module 430 may include hardware and/or software that may receive a signal from XML event problem report bundle module 450 and invoke a script. For example, upon detection of an event or short timer value expiring, XML event problem report bundle module 450 may invoke a script contained in short timer based operations module 430. Scripts contained in short timer based operation module 430 may identify a hardware or software problem, collect data relating to the identified problem, perform an analysis of the collected data, perform a corrective action based on the analysis and send collected data to XML event problem report bundle module 450. The analysis performed by an invoked script within short timer based operation module 430 may include any appropriate analysis algorithm such as, for example, a decision tree or an artificial intelligence database. The specific type of analysis performed by each script may be determined by a specific short timer value that may have expired within XML event problem report bundle module 450. Short timer based operation module 430 may contain scripts to perform trend analysis, detect increments of critical counter values and measure or detect memory leaks, and may also invoke additional scripts based on the collected and analyzed data. For example, if a trend is positively identified by a first script, an additional script may be invoked to reconfigure component(s) within network element 110 in order to adjust to the determined trend. Short timer based operation module 430 may also create new scripts based on the analysis or results of other scripts. For example, if a specific software process is identified as potentially faulty by a previous script, a new script may be created that contains new parameters to monitor and/or shortens a time period within short timer based operation module 430 that invokes the new scripts. Scripts invoked by short timer based operation module 430 may also be referred to as "reactive" scripts, as they may be invoked to react to a short timer value expiring.

Long timer based operation module 440 may include hardware and/or software that may receive a signal from XML event problem report bundle module 450 and invoke a script. For example, upon detection of an event or long timer value expiring, XML problem report bundle module 450 may invoke a script contained in long timer based operation module 440. For example, a script contained in long timer based operation module 440 may collect data and transmit the collected data to XML event problem report bundle module 450 to create an XML event problem report bundle 460. The XML event problem report bundle 460 may then be transmitted to another network device to be analyzed to determine long term trends of network element 110. Data collected by a script invoked by long timer based operation module 440 may also be strategically analyzed to determine potential risks and/or failures that may occur within network element 110, for example. Scripts invoked by long timer based operation module 440 may be referred to as proactive scripts, as the data collected and analyzed may relate to successful operations of network element 110, and may be used to "proactively" reconfigure hardware and/or software within network element 110 before a problem or error occurs.

XML event problem report bundle module 450 may include event policies and time periods that may be used to process received event data 410 and in response to the received event, time period, etc, invoke scripts contained in modules 420-440. For example, XML event problem report bundle module 450 may store events and information relating to an appropriate script and/or module 420-440 to invoke. After determining an appropriate script to invoke, XML event problem report bundle module 450 may send signals and information to the appropriate module (420-440) so that further processing of data may be performed. XML event problem report bundle module 450 may then receive data collected by the scripts invoked (by modules 420-440) and form an XML event problem report bundle 460 with the collected data. For example, XML event problem report bundle module 450 may store XML document structures, parameters and tagged fields relating to all the types of events, short time periods and long time periods that may be detected. For example, each event and time period may be associated with an appropriate XML document or file structure that includes XML header information and XML payload information. In one example, XML event problem report bundle module 450 may receive data collected from a script contained in event trigger module 420 relating to a detected interface failure. This collected data may be received by XML event problem report bundle module 450 and an appropriate XML file header may be determined based on the invoked script. Based on the parameters contained in the XML header file, specific XML payload files may be determined. Using the data received from the script, XML event problem report bundle module 450 may then appropriately tag the data in order to generate the XML header file and the corresponding XML payload files. XML event problem report bundle module 450 may then bundle the XML header file and corresponding XML payload files for transmission to another network device (such as network device 130) as an XML event problem report bundle 460.

XML event problem report bundles 460 may include XML header files and XML payload files that contain data and information collected by scripts contained in modules 420-440. Data contained in XML header files may include predefined XML tagged fields (identified below with < >) used to describe and/or label information. An XML event problem report bundle 460 may contain four sections, such as for example, one XML header file (manifest) section, and three sections of XML payload files such as a configuration section, a trend section and attachments. The XML header file may contain tagged fields, such as, for example, host-event ID, service type, problem class, problem description, priority severity, problem priority, core file path, product name, host name, version information, time of event, core manifest, software stack trace, show chassis hardware, show chassis firmware and problem synopsis. Using these exemplary fields, information contained in a XML header file may be easily identified and accessed by a recipient of a XML event problem report bundle 460. An exemplary XML header file that may be included in an XML event problem report bundle 460 is shown in detail below.

```
<prb-manifest>
    <host-event-ID>baldy-re0-62602-20070611-141401-10</host-event-ID>
    <service-type>event</service-type>
    <problem-class>support</problem-class>
    <problem-sub-class>software</problem-sub-class>
    <problem-category>software crash</problem-category>
    <problem-description>Error due to daemon crash and core dump.</problem-description>
    <problem-severity>2</problem-severity>
    <problem-priority>2</problem-priority>
    <core-file-path>/var/tmp/cosd.core-tarball.4.tgz</core-file-path>
    <router-info>
      <product-name>m10</product-name>
      <host-name>baldy-re0</host-name>
    </router-info>
    <RE-sw>
      <re-name>Routing Engine 0</re-name>
      <mastership-state>Online Master</mastership-state>
      <sw-version-information>
        <component>jkernel-dd</component>
        <major>8</major>
        <minor>2</minor>
        <release-category>R</release-category>
        <build-number>2</build-number>
        <spin></spin>
        <builder>builder</builder>
        <build-date>2007-02-24 04:49:28 UTC</build-date>
      </sw-version-information>
    </RE-sw>
    <event-time>2007-06-11 14:16:00 PDT</event-time>
    <chassis>
      <name>Chassis</name>
      <serial-number>62602</serial-number>
      <description>M10</description>
      <chassis-module>
        <name>Midplane</name>
        <version>REV 03</version>
        <part-number>710-001950</part-number>
        <serial-number>HB6845</serial-number>
        <description>M10 Backplane</description>
        <model-number>CHAS-MP-M10-S</model-number>
      </chassis-module>
```

-continued

```
<chassis-module>
  <name>Power Supply A</name>
  <version>Rev 04</version>
  <part-number>740-002497</part-number>
  <serial-number>MC10980</serial-number>
  <description>AC Power Supply</description>
  <model-number>PWR-M10-M5-AC-S</model-number>
<chassis-module>
<chassis-module>
  <name>Display</name>
  <version>REV 04</version>
  <part-number>710-001995</part-number>
  <serial-number>HL5255</serial-number>
  <description>M10 Display Board</description>
<chassis-module>
<chassis-module>
  <name>Routing Engine</name>
  <version>REV 05</version>
  <part-number>740-005022</part-number>
  <serial-number>P10865700868</serial-number>
  <description>RE-3.0</description>
  <model-number>RE-600-2048-S</model-number>
<chassis-module>
<chassis-module>
  <name>FEB</name>
  <version>REV 07</version>
  <part-number>710-003310</part-number>
  <serial-number>HL6778</serial-number>
  <description>E-FEB</description>
  <model-number>FEB-M10-E-S</model-number>
<chassis-module>
<chassis-module>
  <name>FPC 0</name>
  <description>E-FPC</description>
<chassis-module>
<chassis-module>
  <name>FPC 1</name>
  <description>E-FPC</description>
  <chassis-sub-module>
    <name>PIC 1</name>
    <version>REV 11</version>
    <part-number>750-008425</part-number>
    <serial-number>CF1011</serial-number>
    <description>Adaptive Services</description>
    <model-number>PE-AS</model-number>
  </chassis-sub-module>
<chassis-module>
<chassis-module>
  <name>Fan Tray</name>
  <description>Rear Left Fan Tray</description>
  <model-number>FANTRAY-M10-M5-S</model-number>
<chassis-module>
</chassis>
<firmware-information>
<chassis-module>
  <name>FPC 0</name>
  <firmware-version>Juniper ROM Monitor Version
  4.1b5</firmware-version>
</chassis-module>
<chassis-module>
  <name>FPC 1</name>
  <firmware-version>Juniper ROM Monitor Version
  4.1b5</firmware-version>
</chassis-module>
<chassis-module>
  <name>FEB</name>
  <firmware-version>Juniper ROM Monitor Version
  4.1b5</firmware-version>
</chassis-module>
</firmware-information>
<problem-synopsis>Jun 11 14:14:01 baldy-re0 dumpd:
Core and context for cosd saved in /var/tmp/cosd.core-tarball.4.tgz</problem-synopsis>
</prb-manifest>
```

XML payload files included in an XML event problem report bundle 460 may also include information in tagged fields (identified below with < >). XML payload files may include sections such as the configuration section, trend section and attachments. The specific XML payload file sections may be determined by the problem class field identified in the XML header file. For example, if a problem class error is a hardware failure, specific tagged fields may be included in the XML payload files that provide information relating to the hardware failure. If for example, the problem class error is a software error, specific tagged fields may be included in the XML payload files that provide information relating to the software error. Some examples of tagged fields included in the trend section of the XML payload files may be fields such as, routing engine, show chassis routing engine, flexible PIC connector (FPC), show chassis FPC (brief), show chassis FPC (detail), show nhbd zones (T-series), show nhbd zones (M-series), show bchip ucode bind (M-series), packet forwarding engine (PFE), show PFE statistics traffic, system, show system buffers, show system processes extensive, show system uptime, (SCB), show chassis SCB, show chassis (feb), show chassis smf (brief), show chassis smf (detail), show chassis forwarding. Using descriptive payload fields, information contained in XML payload files may be easily identified and accessed by a recipient of a XML problem report bundle 460. An exemplary XML payload file that includes tagged configuration information that may be included in an XML event problem report bundle 460 is shown below.

```
<name>cosd.core.4</name>
<process>COSD</process>
<binary>/build/palulukon-c/8.2R2/obj-i386/juniper/usr.sbin/
cosd</binary>
<build-date>2007-02-24 04:59:19 UTC</build-date>
<build-server>palulukon.juniper.net</build-server>
<release>8.2R2</release>
<detail>
  cosd.core.4
  COSD release 8.2R2 built by builder on 2007-02-24 04:59:19 UTC
  palulukon.juniper.net:/build/palulukon-c/8.2R2/obj-i386/juniper/
  usr.sbin/cosd
  LD-ELF.SO.1 release 8.2R2 built by builder on 2007-02-24 04:36:06
  UTC
  palulukon.juniper.net:/build/palulukon-c/8.2R2/obj-i386/libexec/
  rtld-elf
  getsubopt.c   8.1 (Berkeley) 6/4/93
  Copyright (c) 1994 Powerdog Industries. All rights reserved.
  strptime.c    0.1 (Powerdog) 94/03/27
  difftime.c    7.7
  getbsize.c    8.1 (Berkeley) 6/4/93
  localtime.c   7.57
  asctime.c     7.7
  rec__seq.c    8.3 (Berkeley) 7/14/94
</detail>
</core-information>
```

In addition to files containing tagged fields of information, XML payload files may include attachment files that may not include tagged fields of information. As shown below, an exemplary attachment file may include numerical data relating to memory statistics by size, memory statistics by type and other text information relating to memory operations within network element 110.

```
<attachment>
  <name>show system virtual-memory</name>
  <output>
```

Memory statistics by bucket size

| Size | In Use | Free | Requests | HighWater | Couldfree |
|---|---|---|---|---|---|
| 16 | 956 | 68 | 6123968 | 1280 | 0 |
| 32 | 611 | 3357 | 3871744 | 640 | 40954 |
| 64 | 5111 | 137 | 26674485 | 320 | 16376 |
| 128 | 4480 | 4064 | 11034965 | 160 | 38166 |
| 256 | 2632 | 2856 | 2122142 | 80 | 18716 |
| 512 | 122 | 6 | 1317594 | 40 | 0 |
| 1K | 30 | 6 | 1862917 | 20 | 0 |
| 2K | 89 | 135 | 20726 | 10 | 1577 |
| 4K | 19 | 2 | 641 | 5 | 0 |
| 8K | 2 | 3 | 9440 | 5 | 0 |
| 16K | 12 | 0 | 12 | 5 | 0 |
| 32K | 2 | 0 | 1890 | 5 | 0 |
| 64K | 17 | 0 | 17 | 5 | 0 |
| 128K | 3 | 0 | 3 | 5 | 0 |
| 256K | 5 | 0 | 5 | 5 | 0 |
| 512K | 2 | 0 | 2 | 5 | 0 |

Memory usage type by bucket size

| Size | Type(s) |
|---|---|
| 16 | uc_devlist, nexusdev, iftable, temp, devbuf, atexit, COS, BPF, DEVFS mount, DEVFS node, vnodes, mount, pcb, soname, proc-args, kld, MD disk, rman, ATA generic, bus, sysctl, jsr, pfestat, idxbucket, ifstate, pfe_ipc, mkey, socket, rtable, ifmaddr, ipfw, ifdevice, iflist, rnode |
| 32 | atkbddev, dirrem, mkdir, diradd, freefile, freefrag, indirdep, bmsafemap, newblk, temp, devbuf, COS, vnodes cluster_save buffer, pcb, soname, proc-args, sigio, kld, Gzip trees, taskqueue, SWAP, eventhandler, bus, sysctl, uidinfo, subproc, pgrp, pfestat, ifservice, itable32, ifstate, pfe_ipc, mkey, rtable, ifmaddr, ipfw, rnode, rtnexthop |
| 64 | isadev, ip6ndp, MFS node, allocindir, allocdirect, pagedep, temp, devbuf, lockf, COS, NULLFS hash, DEVFS name, vnodes, cluster_save buffer, vfscache, pcb, soname, proc-args, file, AR driver, AD driver, Gzip trees, rman, eventhandler, bus, sysctl, subproc, pfestat, pic, ifstate, pfe_ipc, mkey, ifaddr, rtable, ipfw, iflist |
| 128 | ZONE, freeblks, inodedep, temp, devbuf, zombie, Aggregator, COS, DEVFS node, vnodes, mount, cluster_save buffer, vfscache, pcb, soname, proc-args, ttys, dev_t, timecounter, kld, Gzip trees, ISOFS node, bus, uidinfo, cred, session, pfestat, pic, itable16, ifstate, pfe_ipc, mkey, rtable, ifstat, metrics, rtnexthop, iffamily |
| 256 | iflogical, iftable, MFS node, newblk, temp, devbuf, NFS daemon, COS, vnodes, proc-args, kqueue, file desc, Gzip trees, bus, subproc,itable16, ifstate, pfe_ipc, sysctl, rtable, ipfw, rtnexthop, iffamily |
| 512 | iflogical, UFS mount, temp, devbuf, mount, BIO buffer, ptys, ttys, file desc, AR driver, Gzip trees, ISOFS mount, msg, ioctlops, ATA generic, bus, proc, pfestat,lr, pfe_ipc, sysctl, rtable, ipfw, ifstat, rtnexthop |
| 1K | iftable, temp, devbuf, NQNFS Lease, COS, BIO buffer, kqueue, kld, AD driver, Gzip trees, sem, MD disk, bus, ifstate, pfe_ipc, mkey, ipfw, ifdevice |
| 2K | uc_devlist, UFS mount, temp, devbuf, BIO buffer, pcb, AR driver, Gzip trees, ioctlops, bus, ipfw, ifstat, rcache |
| 4K | memdesc, iftable, UFS mount, temp, devbuf, kld, Gzip trees, sem, msg, bus, ipfw |
| 8K | indirdep, temp, devbuf, syncache, Gzip trees |
| 16K | temp, devbuf, shm, msg |
| 32K | UFS mount, kld, Gzip trees |
| 64K | pagedep, devbuf |
| 128K | VM pgdata, MSDOSFS mount, kld |
| 256K | mbuf, UFS ihash, inodedep, NFS hash, ISOFS mount |
| 512K | vfscache, SWAP |

Memory statistics by type

| Type | InUse | MemUse | HighUse | Limit | Type Requests | Kern Limit | Limit Size(s) |
|---|---|---|---|---|---|---|---|
| isadev | 13 | 1K | 1K291840K | 13 | 0 | 0 | 64 |
| atkbddev | 2 | 1K | 1K291840K | 2 | 0 | 0 | 32 |
| uc_devlist | 25 | 3K | 3K291840K | 25 | 0 | 0 | 16,2K |
| nexusdev | 4 | 1K | 1K291840K | 4 | 0 | 0 | 16 |
| memdesc | 1 | 4K | 4K291840K | 1 | 0 | 0 | 4K |
| mbuf | 1 | 176K | 176K291840K | 1 | 0 | 0 | 256K |
| iflogical | 10 | 3K | 3K291840K | 10 | 0 | 0 | 256,512 |
| iftable | 16 | 9K | 9K291840K | 16 | 0 | 0 | 16,256,1K,4K |
| ip6ndp | 0 | 0K | 1K291840K | 2 | 0 | 0 | 64 |
| ZONE | 15 | 2K | 2K291840K | 15 | 0 | 0 | 128 |
| VM pgdata | 1 | 128K | 128K291840K | 1 | 0 | 0 | 128K |
| UFS mount | 15 | 49K | 49K291840K | 15 | 0 | 0 | 512,2K,4K,32K |
| UFS ihash | 1 | 256K | 256K291840K | 1 | 0 | 0 | 256K |
| MFS node | 226 | 57K | 57K291840K | 17337 | 0 | 0 | 64,256 |
| FFS node | 2117 | 530K | 1239K291840K | 19675 | 0 | 0 | 256 |
| dirrem | 0 | 0K | 62K291840K | 20135 | 0 | 0 | 32 |
| mkdir | 0 | 0K | 1K291840K | 4 | 0 | 0 | 32 |
| diradd | 2 | 1K | 1K291840K | 17545 | 0 | 0 | 32 |
| freefile | 1 | 1K | 62K291840K | 17553 | 0 | 0 | 32 |

-continued

| | | | | | | | |
|---|---|---|---|---|---|---|---|
| freeblks | 1 | 1K | 245K291840K | 26103 | 0 | 0 | 128 |
| freefrag | 1 | 1K | 4K291840K | 101023 | 0 | 0 | 32 |
| allocindir | 30 | 2K | 47K291840K | 235710 | 0 | 0 | 64 |
| indirdep | 2 | 1K | 25K291840K | 19019 | 0 | 0 | 32,8K |
| allocdirect | 0 | 0K | 4K291840K | 156387 | 0 | 0 | 64 |
| bmsafemap | 1 | 1K | 1K291840K | 18953 | 0 | 0 | 32 |
| newblk | 1 | 1K | 1K291840K | 392098 | 0 | 0 | 32,256 |
| inodedep | 6 | 257K | 681K291840K | 37103 | 0 | 0 | 128,256K |
| pagedep | 2 | 65K | 65K291840K | 10353 | 0 | 0 | 64,64K |
| temp | 1286 | 94K | 100K291840K | 4519168 | 0 | 0 | 16,32,64,128,256,512,1K,2K,4K,8K,16K |
| devbuf | 179 | 1309K | 1309K291840K | 259 | | | 0,16,32,64,128,256,512,1K,2K,4K,8K,16K,64K |
| lockf | 35 | 3K | 3K291840K | 601485 | 0 | 0 | 64 |
| atexit | 1 | 1K | 1K291840K | 1 | 0 | 0 | 16 |
| zombie | 115 | 15K | 16K291840K | 1876859 | 0 | 0 | 128 |
| NFS hash | 1 | 256K | 256K291840K | 1 | 0 | 0 | 256K |
| NQNFS Lease | 1 | 1K | 1K291840K | 1 | 0 | 0 | 1K |
| NFS daemon | 1 | 1K | 1K291840K | 1 | 0 | 0 | 256 |
| Aggregator | 4 | 1K | 1K291840K | 4 | 0 | 0 | 128 |
| syncache | 1 | 8K | 8K291840K | 1 | 0 | 0 | 8K |
| COS | 13 | 3K | 3K291840K | 15 | 0 | 0 | 16,32,64,128,256,1K |
| BPF | 25 | 1K | 1K291840K | 25 | 0 | 0 | 16 |
| MSDOSFS mount | 1 | 128K | 128K291840K | 1 | 0 | 0 | 128K |
| NULLFS hash | 1 | 1K | 1K291840K | 1 | 0 | 0 | 64 |
| DEVFS mount | 2 | 1K | 1K291840K | 2 | 0 | 0 | 16 |
| DEVFS name | 501 | 32K | 32K291840K | 501 | 0 | 0 | 64 |
| DEVFS node | 487 | 60K | 60K291840K | 494 | 0 | 0 | 16,128 |
| vnodes | 28 | 7K | 7K291840K | 429 | 0 | 0 | 16,32,64,128,256 |
| mount | 15 | 8K | 8K291840K | 17 | 0 | 0 | 16,128,512 |
| cluster_save buffer | 0 | 0K | 1K291840K | 11690 | 0 | 0 | 32,64,128 |
| vfscache | 3619 | 824K | 1192K291840K | 179191 | 0 | 0 | 64,128,512K |
| BIO buffer | 15 | 29K | 400K291840K | 17614 | 0 | 0 | 512,1K,2K |
| pcb | 162 | 17K | 17K291840K | 12939 | 0 | 0 | 16,32,64,128,2K |
| soname | 81 | 10K | 11K291840K | 5323903 | 0 | 0 | 16,32,64,128 |
| proc-args | 176 | 11K | 12K291840K | 1547998 | 0 | 0 | 16,32,64,128,256 |
| ptys | 32 | 16K | 16K291840K | 32 | 0 | 0 | 512 |
| ttys | 187 | 25K | 58K291840K | 19952 | 0 | 0 | 128,512 |
| kqueue | 8 | 4K | 4K291840K | 40 | 0 | 0 | 256,1K |
| sigio | 1 | 1K | 1K291840K | 12 | 0 | 0 | 32 |
| file | 540 | 34K | 37K291840K | 20964464 | 0 | 0 | 64 |
| file desc | 86 | 23K | 29K291840K | 1962885 | 0 | 0 | 256,512 |
| shm | 1 | 12K | 12K291840K | 1 | 0 | 0 | 16K |
| dev_t | 292 | 37K | 37K291840K | 292 | 0 | 0 | 128 |
| timecounter | 10 | 2K | 2K291840K | 10 | 0 | 0 | 128 |
| kld | 11 | 121K | 126K291840K | 34 | 0 | 0 | 16,32,128,1K,4K,32K,128K |
| AR driver | 1 | 1K | 3K291840K | 5 | 0 | 0 | 64,512,2K |
| AD driver | 2 | 2K | 3K291840K | 439995 | 0 | 0 | 64,1K |
| Gzip trees | 0 | 0K | 46K291840K | 138230 | | 0 | 0,32,64,128,256,512,1K,2K,4K,8K,32K |
| ISOFS node | 1137 | 143K | 143K291840K | 1137 | 0 | 0 | 128 |
| ISOFS mount | 8 | 260K | 260K291840K | 8 | 0 | 0 | 512,256K |
| sem | 3 | 6K | 6K291840K | 3 | 0 | 0 | 1K,4K |
| MD disk | 2 | 2K | 2K291840K | 2 | 0 | 0 | 16,1K |
| msg | 4 | 25K | 25K291840K | 4 | 0 | 0 | 512,4K,16K |
| rman | 60 | 4K | 4K291840K | 442 | 0 | 0 | 16,64 |
| ioctlops | 0 | 0K | 2K291840K | 962 | 0 | 0 | 512,2K |
| taskqueue | 2 | 1K | 1K291840K | 2 | 0 | 0 | 32 |
| SWAP | 2 | 549K | 549K291840K | 2 | 0 | 0 | 32,512K |
| ATA generic | 6 | 3K | 3K291840K | 6 | 0 | 0 | 16,512 |
| eventhandler | 17 | 1K | 1K291840K | 17 | 0 | 0 | 32,64 |
| bus | 356 | 31K | 31K291840K | 825 | 0 | 0 | 16,32,64,128,256,512,1K,2K,4K |
| sysctl | 0 | 0K | 1K291840K | 1081638 | 0 | 0 | 16,32,64 |
| uidinfo | 4 | 1K | 1K291840K | 4271 | 0 | 0 | 32,128 |
| cred | 138 | 18K | 20K291840K | 7992670 | 0 | 0 | 128 |
| subproc | 395 | 21K | 25K291840K | 3754491 | 0 | 0 | 32,64,256 |
| proc | 2 | 1K | 1K291840K | 2 | 0 | 0 | 512 |
| session | 11 | 2K | 3K291840K | 9385 | 0 | 0 | 128 |
| pgrp | 12 | 1K | 1K291840K | 9504 | 0 | 0 | 32 |
| jsr | 4 | 1K | 1K291840K | 20 | 0 | 0 | 16 |
| pfestat | 0 | 0K | 1K291840K | 78306 | 0 | 0 | 16,32,64,128,512 |
| pic | 2 | 1K | 1K291840K | 2 | 0 | 0 | 64,128 |
| ifservice | 2 | 1K | 1K291840K | 2 | 0 | 0 | 32 |
| lr | 2 | 1K | 1K291840K | 2 | 0 | 0 | 512 |
| itable32 | 113 | 4K | 4K291840K | 113 | 0 | 0 | 32 |
| itable16 | 181 | 30K | 30K291840K | 184 | 0 | 0 | 128,256 |
| idxbucket | 1 | 1K | 1K291840K | 1 | 0 | 0 | 16 |
| ifstate | 406 | 41K | 41K291840K | 788 | 0 | 0 | 16,32,64,128,256,1K |
| pfe_ipc | 0 | 0K | 1K291840K | 27921 | 0 | 0 | 16,32,64,128,256,512,1K |
| mkey | 394 | 7K | 7K291840K | 1369110 | 0 | 0 | 16,32,64,128,1K |
| socket | 2 | 1K | 1K291840K | 2 | 0 | 0 | 16 |

-continued

| | | | | | | | |
|---|---|---|---|---|---|---|---|
| ifaddr | 17 | 2K | 2K291840K | 17 | 0 | 0 | 64 |
| sysetl | 0 | 0K | 1K291840K | 194 | 0 | 0 | 256,512 |
| rtable | 108 | 15K | 15K291840K | 231 | 0 | 0 | 16,32,64,128,256,512 |
| ifmaddr | 14 | 1K | 1K291840K | 14 | 0 | 0 | 16,32 |
| ipfw | 24 | 14K | 16K291840K | 138 | 0 | 0 | 16,32,64,256,512,1K,2K,4K |
| ifstat | 36 | 34K | 34K291840K | 36 | 0 | 0 | 128,512,2K |
| ifdevice | 10 | 7K | 7K291840K | 10 | 0 | 0 | 16,1K |
| iflist | 2 | 1K | 1K291840K | 2 | 0 | 0 | 16,64 |
| rcache | 4 | 8K | 8K291840K | 4 | 0 | 0 | 2K |
| rnode | 54 | 2K | 2K291840K | 170 | 0 | 0 | 16,32 |
| metrics | 4 | 1K | 1K291840K | 118 | 0 | 0 | 128 |
| rtnexthop | 116 | 17K | 17K291840K | 116 | 0 | 0 | 32,128,256,512 |
| iffamily | 23 | 3K | 3K291840K | 23 | 0 | 0 | 128,256 |

Memory Totals:

| In Use | Free | Requests |
|---|---|---|
| 5857K | 1648K | 53040551 |

| ITEM | SIZE | LIMIT | USED | FREE | REQUESTS |
|---|---|---|---|---|---|
| PIPE: | 192, | 0, | 10, | 75, | 2401356 |
| SWAPMETA: | 160, | 233016, | 0, | 0, | 0 |
| unpcb: | 160, | 0, | 253, | 72, | 1351740 |
| ripcb: | 192, | 30000, | 4, | 38, | 16 |
| syncache: | 128, | 15359, | 0, | 64, | 4550 |
| tcpcb: | 608, | 30000, | 25, | 15, | 16588 |
| udpcb: | 192, | 30000, | 17, | 25, | 340 |
| socket: | 288, | 30000, | 390, | 50, | 1369103 |
| KNOTE: | 96, | 0, | 61, | 65, | 106033 |
| NFSNODE: | 352, | 0, | 0, | 0, | 0 |
| NFSMOUNT: | 544, | 0, | 0, | 0, | 0 |
| VNODE: | 224, | 0, | 32248, | 57, | 32248 |
| NAMEI: | 1024, | 0, | 0, | 32, | 59190810 |
| VMSPACE: | 192, | 0, | 177, | 79, | 1876902 |
| PROC: | 448, | 0, | 192, | 78, | 1876936 |
| DP fakepg: | 64, | 0, | 0, | 0, | 0 |
| PV ENTRY: | 28, | 1474158, | 75899, | 448380, | 2184319697 |
| MAP ENTRY: | 48, | 0, | 2126, | 1402, | 112824663 |
| KMAP ENTRY: | 48, | 44459, | 492, | 148, | 2408725 |
| MAP: | 108, | 0, | 7, | 3, | 7 |
| VM OBJECT: | 92, | 0, | 4674, | 2806, | 45922480 |

```
    38543680  cpu context switches
   121464580  device interrupts
    18410941  software interrupts
   423621375  traps
  2146639970  system calls
          15  kernel threads created
     1868010  fork( ) calls
        8911  vfork( ) calls
           0  rfork( ) calls
           0  swap pager pageins
           0  swap pager pages paged in
           0  swap pager pageouts
           0  swap pager pages paged out
         427  vnode pager pageins
         442  vnode pager pages paged in
       25726  vnode pager pageouts
       27259  vnode pager pages paged out
           0  page daemon wakeups
           0  pages examined by the page daemon
       14927  pages reactivated
   257143488  copy-on-write faults
           0  copy-on-write optimized faults
    75367916  zero fill pages zeroed
    75060920  zero fill pages prezeroed
        1773  intransit blocking page faults
   426640309  total VM faults taken
           0  pages affected by kernel thread creation
   318883678  pages affected by fork( )
     1103706  pages affected by vfork( )
           0  pages affected by rfork( )
   353316501  pages freed
           0  pages freed by daemon
   302659290  pages freed by exiting processes
       34546  pages active
       14850  pages inactive
```

-continued

| | |
|---|---|
| 19706 | pages in VM cache |
| 20012 | pages wired down |
| 424733 | pages free |
| 4096 | bytes per page |
| 311419841 | total name lookups | cache hits (96% pos + 2% neg) system 0% per-directory
deletions 0%, falsehits 0%, toolong 0%

| interrupt | total | rate |
|---|---|---|
| fxp0 irq9 | 3851867 | 7 |
| fxp1 irq11 | 588889 | 1 |
| ata0 irq14 | 538991 | 1 |
| sio0 irq4 | 356 | 0 |
| clk irq0 | 51087276 | 99 |
| rtc irq8 | 65397201 | 127 |
| Total | 121464580 | 237 |

```
                    </output>
                </attachment>
                <attachment>
                    <name>show system queues</name>
                    <output>
```

| | bytes | max | packets | max | drops |
|---|---|---|---|---|---|
| output interface | | | | | |
| fxp0 | 0 | 1250000 | 0 | 4166 | 6 |
| fxp1 | 0 | 1250000 | 0 | 4166 | 20 |
| lsi | 0 | 12500 | 0 | 41 | 0 |
| dsc | 0 | 0 | 0 | 0 | 0 |
| lo0 | 0 | 0 | 0 | 0 | 0 |
| gre | 0 | 12500 | 0 | 41 | 0 |
| ipip | 0 | 12500 | 0 | 41 | 0 |
| tap | 0 | 0 | 0 | 0 | 0 |
| pime | 0 | 12500 | 0 | 41 | 0 |
| pimd | 0 | 12500 | 0 | 41 | 0 |
| mtun | 0 | 12500 | 0 | 41 | 0 |
| sp-1/1/0 | 0 | 1250000 | 0 | 4166 | 0 |
| pd-1/1/0 | 0 | 12500 | 0 | 41 | 0 |
| pe-1/1/0 | 0 | 12500 | 0 | 41 | 0 |
| gr-1/1/0 | 0 | 12500 | 0 | 41 | 0 |
| ip-1/1/0 | 0 | 12500 | 0 | 41 | 0 |
| vt-1/1/0 | 0 | 12500 | 0 | 41 | 0 |
| mt-1/1/0 | 0 | 12500 | 0 | 41 | 0 |
| input protocol | | | | | |
| splfwdq | 0 | 1000000 | 0 | 1000 | 0 |
| splnetq | 0 | 1000000 | 0 | 1000 | 0 |
| arpintrq | 0 | 1000 | 0 | 50 | 0 |
| optionq | 0 | 200000 | 0 | 200 | 0 |
| icmpq | 0 | 50000 | 0 | 50 | 0 |
| frlmiq | 0 | 0 | 0 | 0 | 0 |
| spppintrq | 0 | 25000 | 0 | 250 | 0 |
| atmctlpktq | 0 | 0 | 0 | 0 | 0 |
| atmoamq | 0 | 0 | 0 | 0 | 0 |
| tnpintrq | 0 | 1250000 | 0 | 4166 | 0 |
| tagintrq | 0 | 200000 | 0 | 200 | 0 |
| tagfragq | 0 | 200000 | 0 | 200 | 0 |
| ethoamq | 0 | 65000 | 0 | 500 | 0 |

```
                    </output>
```

It should be understood that the above examples of XML header and payload files are exemplary only. More, less and/or different tagged fields of information may be included in XML event problem report bundles 460 based on any of the detected event, the invoked script or the identified information contained in the problem class field included in the XML header file. In each instance, using specifically determined and descriptive tagged field names, a recipient of an XML event problem report bundle 460 may quickly identify and access information associated with each specific event.

Figure 5:
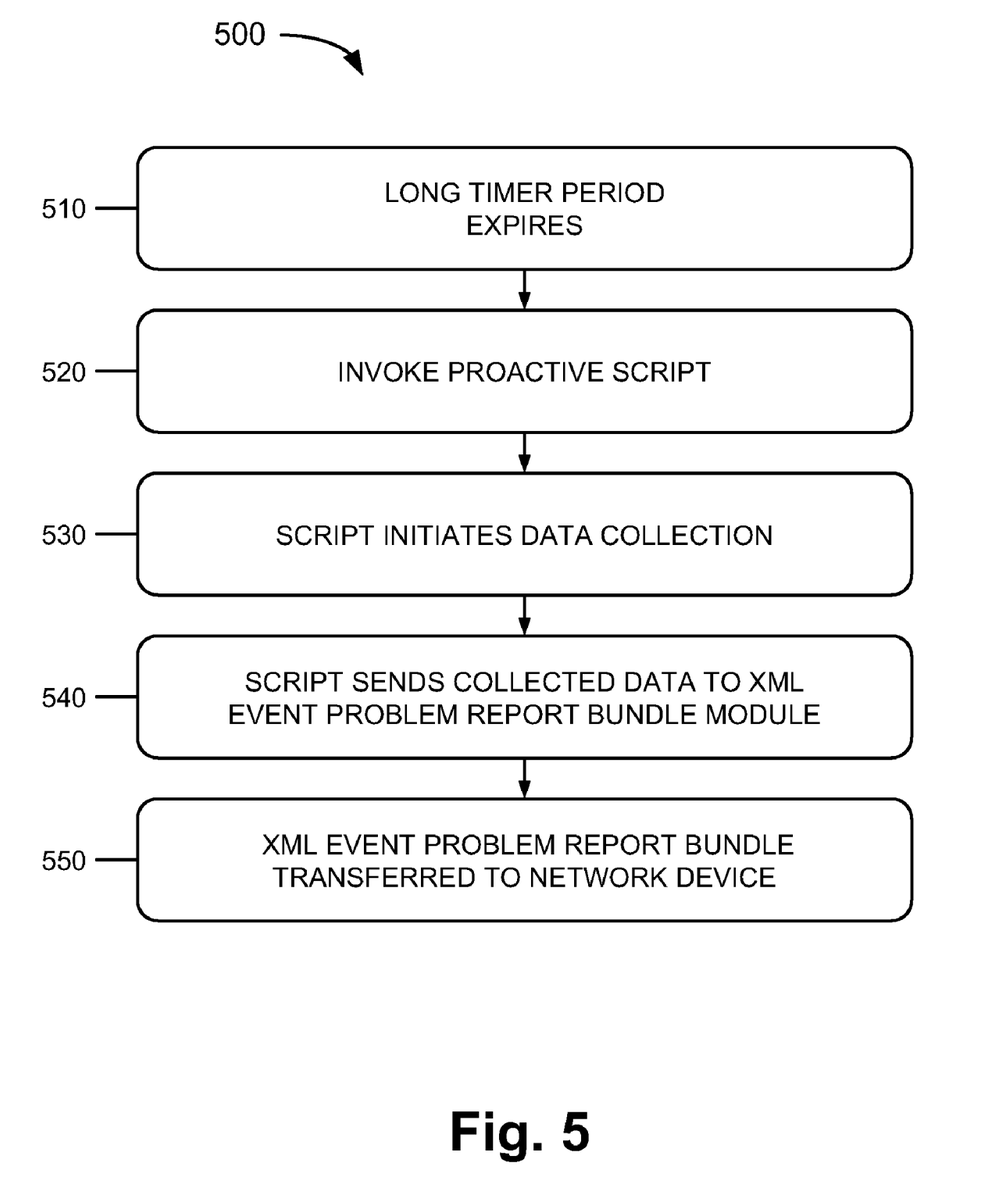
FIG. 5 is a flowchart of an exemplary proactive process.

FIG. 5 is a flowchart illustrating operation of an exemplary proactive process 500. Process 500 may begin when a long timer value expires (block 510). For example, a timer value contained in XML event problem report bundle module 450 may expire. As described above, the timer values contained in XML event problem report bundle module 450 may be on the order of days, weeks, months, etc. Each individual timer value may have a corresponding proactive script contained in long timer based operations module 440 that is invoked upon timer expiration (block 520).

Once invoked, a proactive script may collect data (block 530). For example, a script may collect data at one of interfaces 230 or an invoked script may collect data relating to the operations of processor 210. The invoked proactive script may send the collected data to XML event problem report bundle module 450 (block 540). The details of creating an XML event problem report bundle 460 are described with reference to FIG. 7. Continuing with this example, an XML event problem report bundle 460 may be generated that contains the collected data that may relate to one of interfaces 230. The XML event problem report bundle 460 may then be transferred to network device 130 (block 550). For example, network element 110 may transmit an XML event problem report bundle 460 to network device 130 for analysis of the collected data. Details of receiving and analyzing an XML event problem report bundle 460 are described with reference to FIG. 8.

Figure 6:
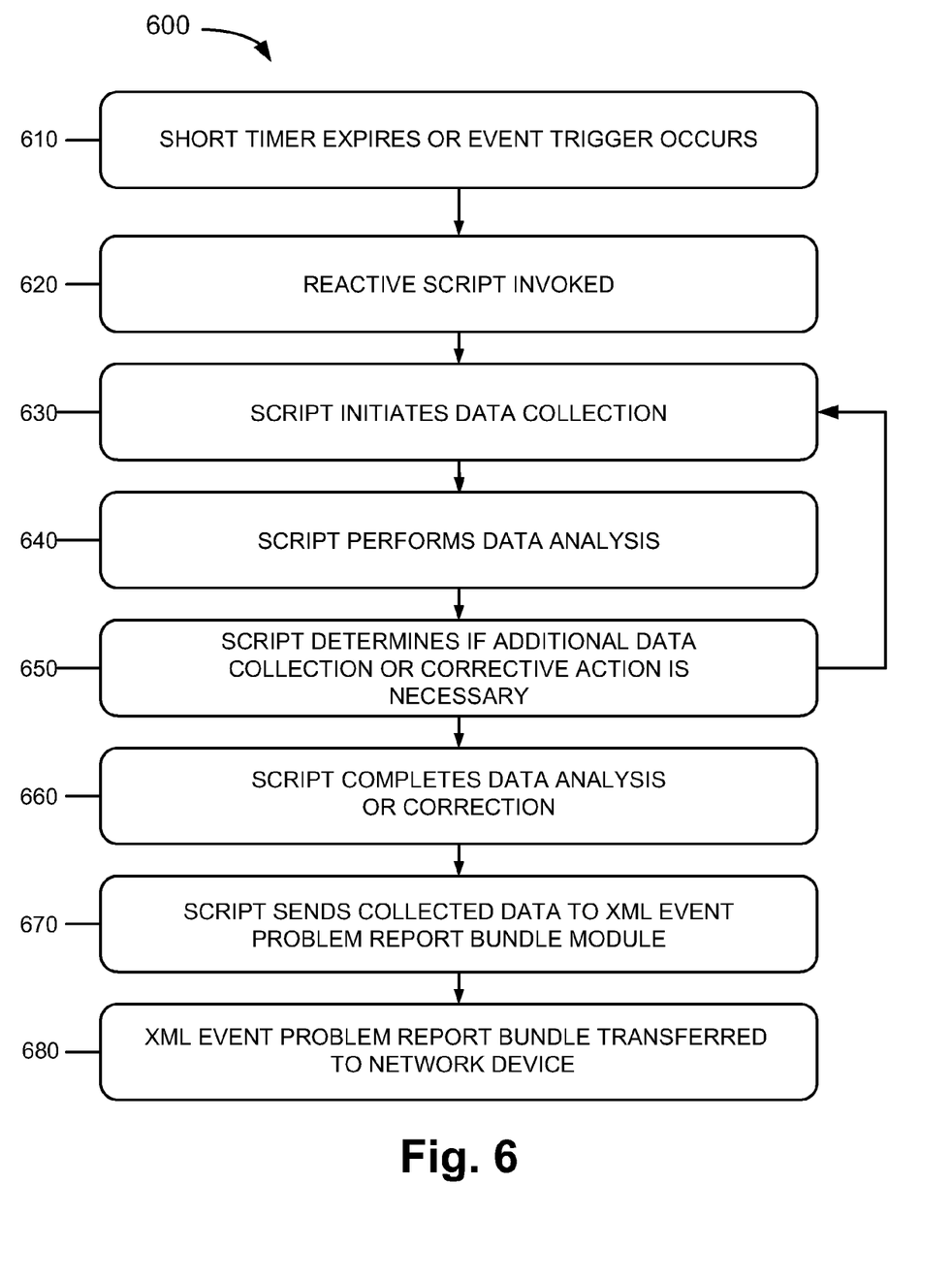
FIG. 6 is a flowchart of an exemplary reactive process.

FIG. 6 is a flowchart that illustrates operations of an exemplary reactive process 600. Process 600 may begin when a short timer expires or an event trigger occurs (block 610). For example, an event 410 may be received and may be compared to event policies contained in XML event problem report bundle module 450. For example, each event and short timer value in XML event problem report bundle module 450 may be associated with a corresponding reactive script contained in short timer based operations module 430. Upon detection of an event or time period, and association with event policies, XML event problem report bundle module 450 may then invoke a reactive script contained in short timer based operations module 430 (block 620).

Once invoked, a reactive script may initiate data collection (block 630). For example, a received event 410 may result in invoking a reactive script contained in event trigger module 420. The received event 410 may be that 50% of memory 220 is being used, that may indicate a potential memory leak. Data may be collected relating to hardware aspects of memory 220 and data may be collected relating to software processes or operations that may currently be accessing memory 220. The data collected regarding the operation of memory 220 may then be analyzed (block 640). For example, the analyzed data collected (in block 630) may indicate that hardware aspects of memory 220 are functioning properly. Other data collected (in block 630) by the invoked reactive script may relate to the amount of data stored in routing tables or forwarding tables contained in routing information base (RIB). This data may also be analyzed to determine if a certain portion (e.g. 50 percent) of memory usage is normal based on the information in RIB.

Based on the analysis performed in block 640, the invoked script may determine if additional data collection may be necessary or if corrective action may be taken (block 650). Continuing with the above example, if the analysis of the data relating to the RIB indicates that the network element is currently receiving large amounts of data, a 50% memory usage would be determined to be acceptable and no corrective action may be taken, (block 650), thus completing the data analysis and corrective actions (block 660).

If for example, an analysis of the data indicates that a small amount of data is being received by network element 110, this may indicate that a memory leak is occurring and another reactive script may be invoked to collect data relating to other processes currently accessing memory 220 (block 650). An additionally invoked reactive script may collect and analyze data and determine that a software process is not releasing memory space within memory 220. In response to this analysis, the script may shut down the detected faulty software process and launch another process to replace the faulty software (block 660).

The reactive script may then send the collected data to XML event problem report bundle module 450 (block 670). For example, corrective actions taken and data collected by the invoked script may be sent to XML event problem report bundle module 450, so that an XML event problem report bundle 460 may be generated. Further details of generating an XML event problem report bundle 460 are described below with reference to FIG. 7. The generated XML event problem report bundle 460 may then be transferred to a network device (block 680). For example, an event problem report bundle 460 may be transferred from network element 110 to network device 130 via network 120. Details of receiving and processing an XML event problem report bundle 460 are described below with reference to FIG. 8.

Figure 7:
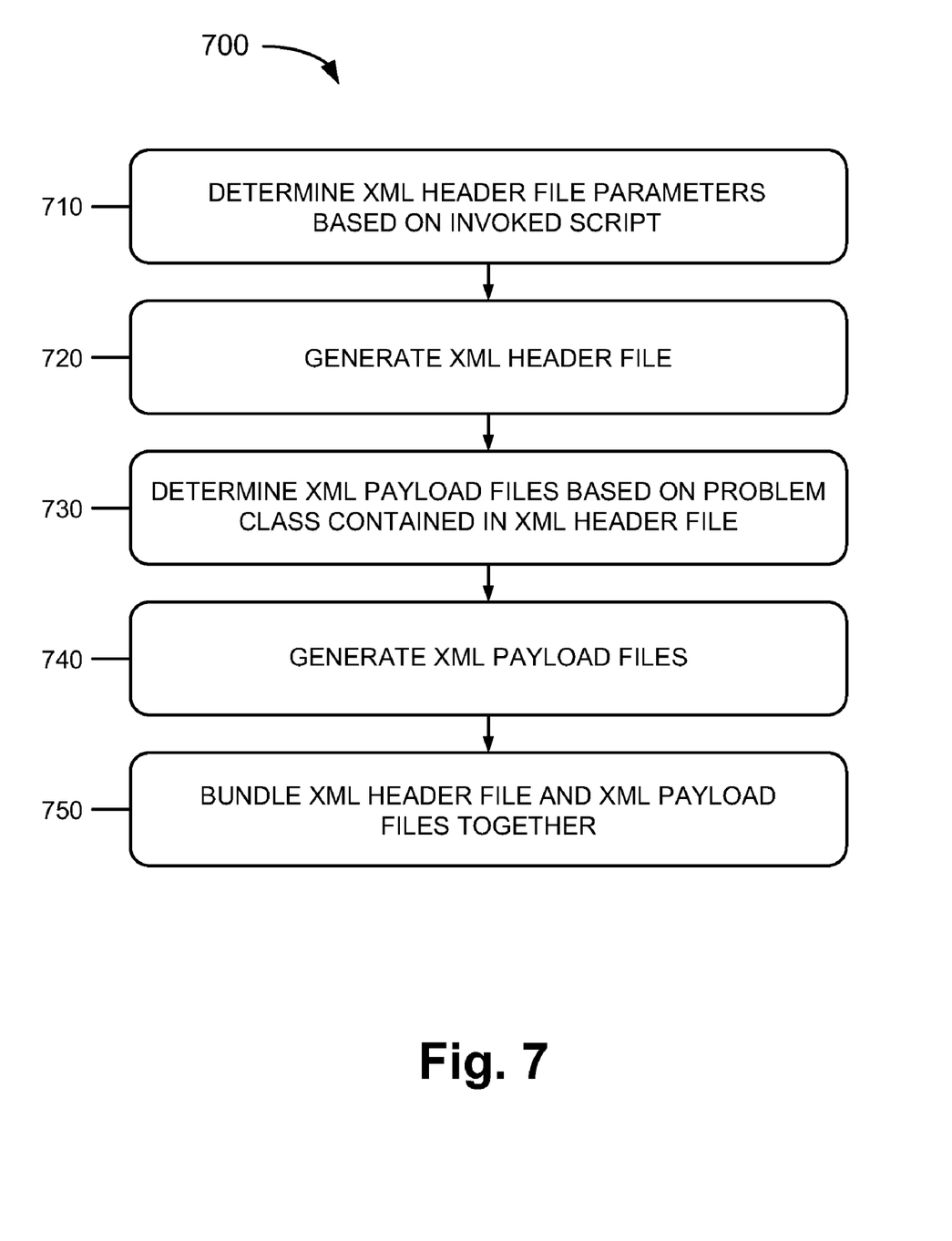
FIG. 7 is a flowchart of an exemplary process that creates XML event problem report bundles.

FIG. 7 is a flowchart illustrating operation of an exemplary XML event problem report bundle generation process 700. As mentioned above, process 700 may be enacted in blocks 540-550 (as shown in FIG. 5) or blocks 670-680 (as shown in FIG. 6). Process 700 may begin when XML event problem report bundle module 450 receives data collected by a script and determines an XML header file based on the invoked script (block 710). For example, XML event problem report bundle module 450 may receive data collected by a script invoked by an event, and based on the invoked script associated with this event, the appropriate XML header file structure and parameters may be selected. The XML header file parameters may include tagged fields of information such as, for example, host-event ID, service type, problem class, problem description, priority severity, problem priority, core file path, product name, host name, version information, time of event, core manifest, software stack trace, show chassis hardware, show chassis firmware and problem synopsis. After the appropriate XML header file parameters have been determined, the XML header file may be generated (block 720). For example, the information for each determined tagged field within the header is appropriately completed and tagged as shown in the exemplary XML header file above. After the XML header file has been generated, XML payload files may be determined based on the problem class field contained in the XML header file (block 730). For example, XML event problem report bundle module 450 may store and associate tagged fields of information that may be included in XML payload files for each type of problem class field in an XML header file. As described above, a software error identified in the problem class field of the XML header file may be associated with specific payload fields to be included in the XML payload files and a hardware failure identified in the problem class field of the XML header file may be associated with specific payload fields to be included in the XML payload files. After the appropriate XML payload files have been determined, the XML payload files may be generated (block 740). For example, information relating to the determined problem class of the detected event may be tagged with the associated specific payload fields, to form an XML payload file as shown above. In other examples, attachment files that do not necessarily contain tagged fields, for example the memory usage files as shown above, may be included in the XML payload files. Once the XML payload files have been generated, XML event problem report bundle module 450 may bundle the XML header file and XML payload files together to form an XML event problem report bundle 460 (block 750). Once bundled, the XML event problem report bundle 460 may be transmitted (as shown in blocks 550 and 680) to network device 130. In this manner, XML event problem report bundle module 450 may provide a descriptive and flexible system of report errors within a network element.

Figure 8:
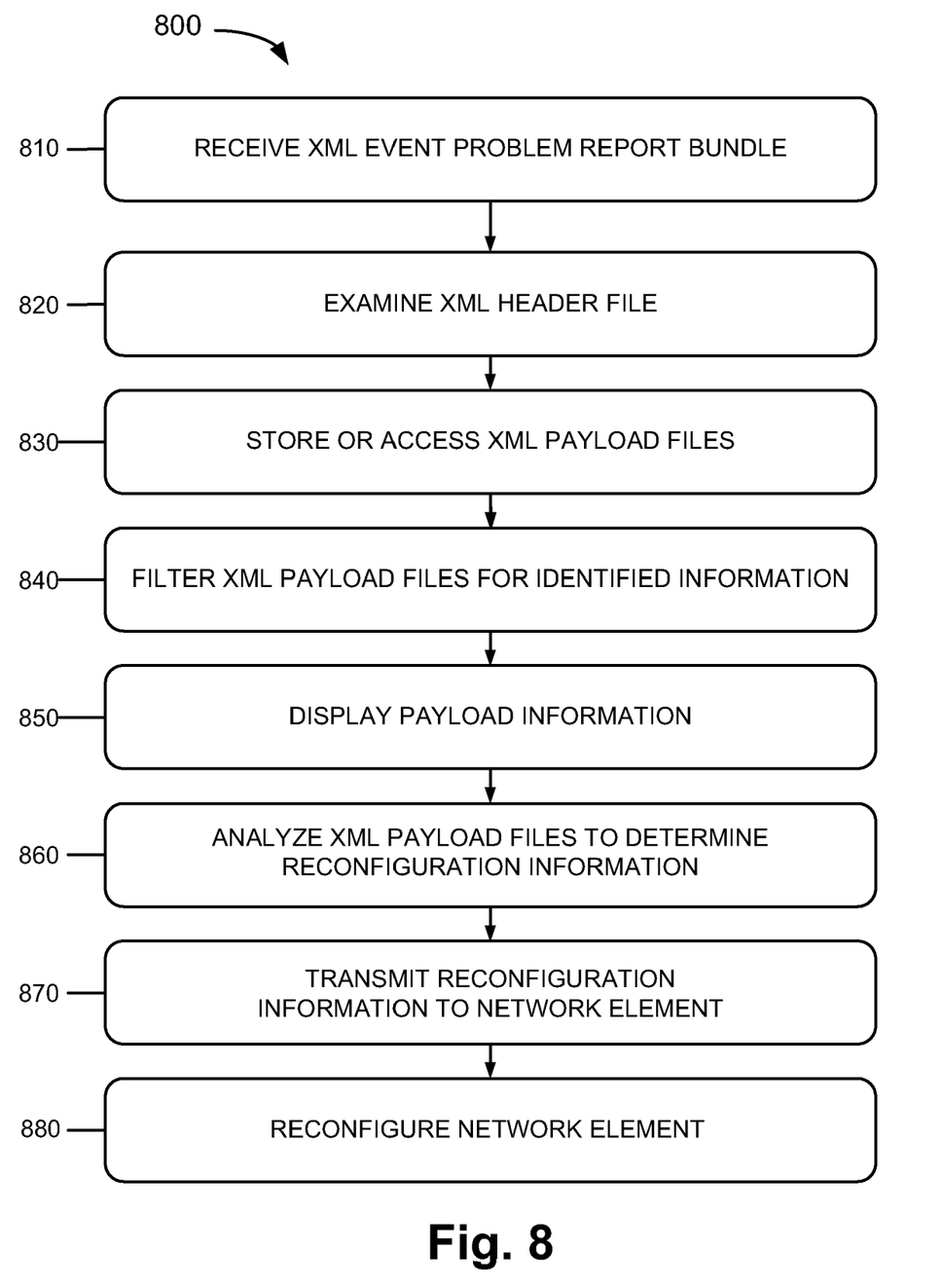
FIG. 8 is a flowchart of an exemplary process of receiving an XML event problem report bundle.

FIG. 8 is a flowchart illustrating operation of an exemplary process 800 of receiving an XML event problem report bundle. Process 800 may begin when an XML event problem report bundle 460 is received by network device 130 (block 810). For example, network element 110 may have generated and transmitted an XML event problem report bundle 460 as described above. After being received by network device 130, the XML header file included in the XML event problem report bundle 460 may be examined (block 820). For example, network device 130 may include data mining and processing tools that may search for, or map directly to, identified specific tagged fields of information contained within XML header file. For example, an operator of network device 130 may be concerned with only specific network elements (such as network element 110) or specific types of errors that may occur in any network element connected to network 120. In this case, network device 130 may be programmed to automatically search for all received XML event problem report bundles 460 for specific tagged fields of information contained within the XML header files. When an XML header file is identified as including a specifically identified tagged field, network device 130 (or an operator) may quickly determine if information contained in the XML payload files should be further accessed and/or analyzed. In further examples, network device 130 may contain a customer relationship manager (CRM) tool that may directly map to and extract information contained in the XML header file in order to form a network trouble ticket. For example, information contained in tagged fields, such as for example, problem description, platform, time of problem, serial number, priority, severity of event, may be automatically extracted and a placed into a network trouble ticket. Further, using a CRM tool contained in network device 130 allows for tagged fields to be specifically identified for each different customer connected to network 120. For example, one customer may be concerned with one type of tagged error field and a second customer may be concerned with one type of tagged device field. In this manner, network device 130 may "customize" network trouble tickets for each different customer. In the above examples, as network device 130 may directly map to or search for specific tagged fields, as opposed to searching through all data, this minimizes the amount of information to be searched and minimizes processing required by network device 130. Additionally, searching for specifically identified tagged fields in the XML header file, further reduces processing required by network device 130, as it may be determined (before searching the XML payload files) whether the associated XML payload files contain information of interest (worth processing).

Based on an examination of the XML header file, the XML payload files may be stored or accessed (block 830). For example, if an XML header file does not contain specifically identified tagged fields of interest to an operator, the entire contents of the received XML event problem report bundle 460 may be stored in network device 130. If however, the XML header file contains specifically identified tagged fields of interest, such as a specific network element or a specific type of event, the XML payload files may be accessed. As the XML event problem report bundle 460 may contain a number of XML payload files, these payload files may be filtered to quickly access the identified information of interest (block 840). For example, XML payload files may be filtered automatically by network device 130, to search for identified keywords or tagged fields, or an operator may filter through the XML payload files manually. In one example, an operator may program network device 130 to automatically filter and check a tagged problem severity field, and if the information in the problem severity field is a "5" (where severity is ranked from 1 to 5, 5 being the highest value), the information in that corresponding XML payload file will be flagged for further processing. Additionally, network device 130 may be programmed to instigate another action, such as sending an alert email, in response to the determination that a problem severity "5" error has occurred. Once filtered, the information within identified XML payload files may then be displayed for analysis (block 850). For example, a table of numerical data relating to memory statistics based on bucket size (as shown above) may be filtered out of an XML payload file and displayed. Also for example, a trouble ticket formed using a CRM tool as described above, may be displayed (or printed) in order to provide specifically customized and filtered tagged fields of information.

After information in the identified XML payload files are displayed, the data may be analyzed in order to determine reconfiguration information (block 860). Reconfiguration information may include any type of information to be transmitted to network element 110, such as, for example, a new software process or a script. Upon analysis of the data within an XML payload file, an operator may determine that an interface 230 is currently operating, however, based on the operator's knowledge of interface errors occurring within other network elements, the operator may determine or flag that interface 230 may potentially fail based on previously received data contained in other XML event problem report bundles. In other examples, network device 130 may automatically analyze data within XML payload files to determine if any reconfiguration information is necessary. For example, a long time period may expire within network element 110, which prompts a proactive script to collect data. The analyzed data in the received XML payload files may indicate that a software process contained in network element 110 is more than one year old and therefore a new updated software process is needed. In another example, the numerical data relating to statistics of memory use by bucket size, as shown above, may be automatically filtered from an XML payload attachment file and inputted into a program contained in network device 130 in order to analyze these statistics. An analysis of these statistics may indicate that memory configurations within network element 110 are optimized or that (a memory specific) reconfiguration information is necessary. In further examples, using a CRM tool, network device 130 may automatically transmit reconfiguration information to all network devices of a specific customer based on an the analysis of data received from one of the customer's network devices. For example, if data analyzed from one router contains a faulty software process, network device 130 may transmit a new software process to all the routers (owned and operated by that specific customer).

Once the analysis of data contained in the XML payload files is complete, network device may transmit reconfiguration information to network element 110 (block 870). For example, based on the analysis of the statistics of memory use, network device 130 may transmit an updated software process to replace an inefficient software process within network element 110. Network device 130 may also transmit a script that may be used within network element 110 to collect further data, based on analyzed data within a received XML payload file.

After receiving the reconfiguration information, network element 110 may be reconfigured (block 880). For example, a script may be transmitted by network device 130 and may be stored in event trigger module 420 within network element 110. An updated interface software process may be stored in buffer manager 350, in order to manage buffer operations more efficiently. As network device 130 may receive XML event problem report bundles 460 from a plurality of network elements 110, network device 130 and/or an operator, may be aware of and compensate for, trends or tendencies within network elements 110 that may be unnoticed by existing systems.

Therefore the exemplary systems and processes described above may provide a descriptive and flexible manner of reporting event data within a network element. Further, the systems and processes described may also provide automatic analysis of errors and provide reconfiguration information that may be used to avoid errors in network element 110 before they occur.

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks have been described with regard to the processes illustrated in FIGS. 5-8, the order of the blocks may be modified in other implementations. Further, non-dependent blocks may represent blocks that can be performed in parallel. For example, blocks 510-550 that are performed for one interface may be independent of blocks 510-550 for a second interface and, therefore, may be performed in parallel to blocks 510-550 for the second interface. Also, it may be possible to omit blocks within a process. For example, a received XML event problem report bundle may be processed by blocks 810-830 and blocks 840-880 may not be performed. In further examples, block 850 may be omitted from process 800.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
a processor to:
receive an XML document including an XML header portion and XML payload portions;
examine tagged fields in the XML header portion to determine whether tagged fields in the XML payload files are identified;
filter, when tagged fields within the XML payload portions are identified in the tagged fields in the XML header portion, the XML payload portions for the identified tagged fields, where the tagged fields within the XML header portion and the XML payload portions relate to an event that occurred in a second network device, and where untagged fields within the XML header portion and the XML payload portions do not relate to the event; and
analyze information in the identified tagged fields.

2. The network device of claim 1, where the processor is further to:
determine reconfiguration information based on the analyzed information in the identified tagged fields.

3. The network device of claim 2, where the processor is further to:
transmit the reconfiguration information to the second network device.

4. The network device of claim 3, where the reconfiguration information further includes:
at least one of a software process or a script.

5. The network device of claim 1, where information in the XML payload files further includes:
at least one of text, binary or numeric information.

6. A method comprising:
receiving, by a network device, an XML structured document including an XML header file and a plurality of XML payload files, where the XML header file and the plurality of XML payload files include tagged fields of information that relate to an event that occurred in a remote network device;
examining, by the network device, the tagged fields of information in the XML header file to determine whether tagged fields of information in the XML payload files are identified;
when the tagged fields of information in the XML payload files are identified, filtering, by the network device, the XML payload files for the identified tagged fields of information; and
analyzing, by the network device, information in the identified tagged fields of information.

7. The method of claim 6, further including:
storing the received XML structured document when examining the tagged fields of information in the XML header file does not identify tagged fields of information in the XML payload files.

8. The method of claim 6, further comprising:
determining reconfiguration information based on analyzing the information; and
transmitting the reconfiguration information to the remote network device.

9. The method of claim 8, where the reconfiguration information further includes
at least one of a software process or a script.

10. The method of claim 6, where the XML header file includes information identifying the remote network device and the event.

* * * * *